United States Patent
Deng et al.

(10) Patent No.: US 8,302,100 B2
(45) Date of Patent: *Oct. 30, 2012

(54) SYSTEM FOR BALANCE DISTRIBUTION OF REQUESTS ACROSS MULTIPLE SERVERS USING DYNAMIC METRICS

(75) Inventors: Yuefan Deng, Setauket, NY (US); Stephen J. Engel, East Northport, NY (US); Joseph Giustozzi, Plainview, NY (US); Thomas O'Brien, Kings Park, NY (US)

(73) Assignee: Galactic Computing Corporation BVI/BC, Hong Kong (HK)

( * ) Notice: Subject to any disclaimer, the term of this patent is extended or adjusted under 35 U.S.C. 154(b) by 1336 days.

This patent is subject to a terminal disclaimer.

(21) Appl. No.: 11/202,644

(22) Filed: Aug. 12, 2005

(65) Prior Publication Data
US 2006/0036743 A1 Feb. 16, 2006

Related U.S. Application Data

(63) Continuation of application No. 09/765,766, filed on Jan. 1, 2001, now Pat. No. 6,938,256.

(60) Provisional application No. 60/176,665, filed on Jan. 18, 2000.

(51) Int. Cl.
*G06F 9/46* (2006.01)
*G06F 15/16* (2006.01)
(52) U.S. Cl. .................... 718/104; 718/105; 709/229
(58) Field of Classification Search .................. 718/104
See application file for complete search history.

(56) References Cited

U.S. PATENT DOCUMENTS

| | | | |
|---|---|---|---|
| 3,764,747 A | 10/1973 | Nakajima et al. | |
| 4,502,116 A | 2/1985 | Fowler et al. | |
| 4,920,487 A | 4/1990 | Baffes | |
| 5,031,089 A | 7/1991 | Liu et al. | |
| 5,155,854 A * | 10/1992 | Flynn et al. | 718/104 |

(Continued)

FOREIGN PATENT DOCUMENTS

CA 2415770 4/2010
(Continued)

OTHER PUBLICATIONS

Management of the Access Network and Service Provisioning, Jani Hursti, Seminar in Internetworking, Apr. 19, 1999.

(Continued)

*Primary Examiner* — Camquy Truong
(74) *Attorney, Agent, or Firm* — Patterson Thuente Christensen Pedersen, PA

(57) ABSTRACT

A system for distributing incoming client requests across multiple servers in a networked client-server computer environment processes all requests as a set that occur within a given time interval and collects information on the attributes of the requests and the resource capability of the servers to dynamically allocate requests in a set to the appropriate servers upon completion of the time interval. Preferably, a request table collects at least two requests incoming within a predetermined time interval, a request examiner routine analyzes each collected request with respect to at least one attribute, a system status monitor collects resource capability information of each server in a resource table and an optimization and allocation process distributes collected requests in the request table across the multiple servers upon completion of said time interval based on an optimization of potential pairings of the requests in the request table with servers in the resource table.

5 Claims, 2 Drawing Sheets

U.S. PATENT DOCUMENTS

| | | | |
|---|---|---|---|
| 5,187,710 A | 2/1993 | Chau et al. | |
| 5,247,427 A | 9/1993 | Driscoll et al. | |
| 5,251,097 A | 10/1993 | Simmons et al. | |
| 5,303,297 A | 4/1994 | Hillis | |
| 5,335,343 A | 8/1994 | Lampson et al. | |
| 5,351,286 A | 9/1994 | Nici | |
| 5,371,848 A | 12/1994 | Casey et al. | |
| 5,460,441 A | 10/1995 | Hastings et al. | |
| 5,473,773 A | 12/1995 | Aman et al. | |
| 5,487,170 A | 1/1996 | Bass et al. | |
| 5,488,541 A | 1/1996 | Mistry et al. | |
| 5,504,894 A | 4/1996 | Ferguson et al. | |
| 5,504,899 A | 4/1996 | Raz | |
| 5,504,900 A | 4/1996 | Raz | |
| 5,537,542 A | 7/1996 | Eilert et al. | |
| 5,539,883 A | 7/1996 | Allon et al. | |
| 5,548,683 A | 8/1996 | Engel et al. | |
| 5,586,312 A | 12/1996 | Johnson et al. | |
| 5,615,329 A | 3/1997 | Kern et al. | |
| 5,630,081 A | 5/1997 | Rybicki et al. | |
| 5,664,106 A * | 9/1997 | Caccavale | 709/224 |
| 5,675,739 A | 10/1997 | Eilert et al. | |
| 5,675,785 A | 10/1997 | Hall et al. | |
| 5,696,895 A | 12/1997 | Hemphill et al. | |
| 5,701,480 A | 12/1997 | Raz | |
| 5,745,884 A | 4/1998 | Carnegie et al. | |
| 5,764,915 A | 6/1998 | Heimsoth et al. | |
| 5,771,354 A | 6/1998 | Crawford | |
| 5,774,668 A | 6/1998 | Choquier et al. | |
| 5,794,221 A | 8/1998 | Egendorf | |
| 5,795,228 A | 8/1998 | Trumbull et al. | |
| 5,819,092 A | 10/1998 | Ferguson et al. | |
| 5,822,531 A | 10/1998 | Gorczyca et al. | |
| 5,828,737 A | 10/1998 | Sawyer | |
| 5,832,222 A | 11/1998 | Dziadosz et al. | |
| 5,845,267 A | 12/1998 | Ronen | |
| 5,875,306 A | 2/1999 | Bereiter | |
| 5,877,938 A | 3/1999 | Hobbs et al. | |
| 5,889,944 A | 3/1999 | Butt et al. | |
| 5,899,980 A | 5/1999 | Wilf et al. | |
| 5,901,228 A | 5/1999 | Crawford | |
| 5,912,802 A | 6/1999 | Nelson | |
| 5,928,323 A | 7/1999 | Gosling et al. | |
| 5,938,732 A | 8/1999 | Lim et al. | |
| 5,946,670 A | 8/1999 | Motohashi et al. | |
| 5,948,065 A | 9/1999 | Eilert et al. | |
| 5,951,694 A | 9/1999 | Choquier et al. | |
| 5,956,391 A | 9/1999 | Melen et al. | |
| 5,956,697 A | 9/1999 | Usui | |
| 5,974,462 A | 10/1999 | Aman et al. | |
| 5,978,577 A | 11/1999 | Rierden et al. | |
| 5,983,225 A | 11/1999 | Anfindsen | |
| 5,983,326 A | 11/1999 | Hagersten et al. | |
| 5,987,621 A | 11/1999 | Duso et al. | |
| 5,991,792 A | 11/1999 | Nageswaran | |
| 5,999,965 A | 12/1999 | Kelly | |
| 6,006,259 A | 12/1999 | Adelman et al. | |
| 6,011,791 A | 1/2000 | Okada et al. | |
| 6,014,651 A | 1/2000 | Crawford | |
| 6,014,669 A | 1/2000 | Slaughter et al. | |
| 6,025,989 A | 2/2000 | Ayd et al. | |
| 6,035,281 A | 3/2000 | Crosskey et al. | |
| 6,035,356 A | 3/2000 | Khan et al. | |
| 6,038,587 A | 3/2000 | Phillips et al. | |
| 6,041,354 A | 3/2000 | Biliris et al. | |
| 6,067,545 A | 5/2000 | Wolff | |
| 6,067,580 A | 5/2000 | Aman et al. | |
| 6,070,191 A | 5/2000 | Narendran et al. | |
| 6,088,727 A | 7/2000 | Hosokawa et al. | |
| 6,088,816 A | 7/2000 | Nouri et al. | |
| 6,092,178 A | 7/2000 | Jindal et al. | |
| 6,094,351 A | 7/2000 | Kikinis | |
| 6,094,680 A | 7/2000 | Hokanson | |
| 6,097,882 A | 8/2000 | Mogul | |
| 6,105,067 A | 8/2000 | Batra | |
| 6,108,703 A | 8/2000 | Leighton et al. | |
| 6,112,243 A | 8/2000 | Downs et al. | |
| 6,115,693 A | 9/2000 | McDonough et al. | |
| 6,134,673 A | 10/2000 | Chrabaszcz | |
| 6,145,098 A | 11/2000 | Nouri et al. | |
| 6,151,688 A | 11/2000 | Wipfel et al. | |
| 6,154,787 A | 11/2000 | Urevig et al. | |
| 6,157,927 A | 12/2000 | Schaefer et al. | |
| 6,167,446 A | 12/2000 | Lister et al. | |
| 6,170,067 B1 | 1/2001 | Liu et al. | |
| 6,173,322 B1 | 1/2001 | Hu | |
| 6,182,109 B1 | 1/2001 | Sharma et al. | |
| 6,185,598 B1 | 2/2001 | Farber et al. | |
| 6,199,111 B1 | 3/2001 | Hara et al. | |
| 6,199,173 B1 | 3/2001 | Johnson et al. | |
| 6,209,018 B1 | 3/2001 | Ben-Shachar et al. | |
| 6,216,185 B1 | 4/2001 | Chu | |
| 6,223,202 B1 | 4/2001 | Bayeh | |
| 6,230,183 B1 | 5/2001 | Yocom et al. | |
| 6,233,587 B1 | 5/2001 | Tandon | |
| 6,243,737 B1 | 6/2001 | Flanagan et al. | |
| 6,243,838 B1 | 6/2001 | Liu et al. | |
| 6,266,721 B1 | 7/2001 | Sheikh et al. | |
| 6,272,675 B1 | 8/2001 | Schrab et al. | |
| 6,279,001 B1 | 8/2001 | DeBettencourt et al. | |
| 6,298,451 B1 | 10/2001 | Lin | |
| 6,301,612 B1 | 10/2001 | Selitrennikoff et al. | |
| 6,317,773 B1 | 11/2001 | Cobb et al. | |
| 6,324,580 B1 | 11/2001 | Jindal et al. | |
| 6,327,579 B1 | 12/2001 | Crawford | |
| 6,330,689 B1 | 12/2001 | Jin et al. | |
| 6,338,112 B1 | 1/2002 | Wipfel et al. | |
| 6,374,243 B1 | 4/2002 | Kobayashi et al. | |
| 6,374,297 B1 | 4/2002 | Wolf et al. | |
| 6,389,012 B1 | 5/2002 | Yamada et al. | |
| 6,405,317 B1 | 6/2002 | Flenley et al. | |
| 6,411,943 B1 | 6/2002 | Crawford | |
| 6,411,956 B1 | 6/2002 | Ng | |
| 6,412,079 B1 | 6/2002 | Edmonds et al. | |
| 6,421,661 B1 | 7/2002 | Doan et al. | |
| 6,421,688 B1 | 7/2002 | Song | |
| 6,421,777 B1 | 7/2002 | Pierre-Louis et al. | |
| 6,425,006 B1 | 7/2002 | Chari et al. | |
| 6,430,618 B1 | 8/2002 | Karger et al. | |
| 6,442,618 B1 | 8/2002 | Phillips et al. | |
| 6,446,200 B1 | 9/2002 | Ball et al. | |
| 6,452,809 B1 | 9/2002 | Jackson et al. | |
| 6,460,082 B1 | 10/2002 | Lumelsky et al. | |
| 6,463,454 B1 * | 10/2002 | Lumelsky et al. | 718/105 |
| 6,496,828 B1 | 12/2002 | Cochrane et al. | |
| 6,504,996 B1 | 1/2003 | Na et al. | |
| 6,519,553 B1 | 2/2003 | Barnette et al. | |
| 6,519,679 B2 | 2/2003 | Devireddy et al. | |
| 6,532,488 B1 | 3/2003 | Ciarlante et al. | |
| 6,542,926 B2 | 4/2003 | Zalewski et al. | |
| 6,553,416 B1 | 4/2003 | Chari et al. | |
| 6,553,420 B1 | 4/2003 | Karger et al. | |
| 6,574,748 B1 | 6/2003 | Andress et al. | |
| 6,578,147 B1 | 6/2003 | Shanklin et al. | |
| 6,587,938 B1 | 7/2003 | Eilert et al. | |
| 6,601,096 B1 | 7/2003 | Lassiter, Jr. | |
| 6,606,253 B2 | 8/2003 | Jackson et al. | |
| 6,608,832 B2 | 8/2003 | Forslow | |
| 6,615,199 B1 | 9/2003 | Bowman-Amuah | |
| 6,615,265 B1 | 9/2003 | Leymann et al. | |
| 6,625,639 B1 | 9/2003 | Miller et al. | |
| 6,633,916 B2 | 10/2003 | Kauffman | |
| 6,640,244 B1 | 10/2003 | Bowman-Amuah | |
| 6,640,249 B1 | 10/2003 | Bowman-Amuah | |
| 6,647,508 B2 | 11/2003 | Zalewski et al. | |
| 6,651,125 B2 | 11/2003 | Maergner et al. | |
| 6,681,316 B1 | 1/2004 | Clermidy et al. | |
| 6,681,342 B2 | 1/2004 | Johnson et al. | |
| 6,684,343 B1 | 1/2004 | Bouchier et al. | |
| 6,687,729 B1 | 2/2004 | Sievert et al. | |
| 6,687,831 B1 | 2/2004 | Albaugh et al. | |
| 6,704,737 B1 | 3/2004 | Nixon et al. | |
| 6,704,768 B1 | 3/2004 | Zombek et al. | |
| 6,714,980 B1 | 3/2004 | Markson et al. | |
| 6,715,145 B1 | 3/2004 | Bowman-Amuah | |
| 6,718,359 B2 | 4/2004 | Zisapel et al. | |
| 6,718,415 B1 | 4/2004 | Chu | |

| | | |
|---|---|---|
| 6,721,568 B1 | 4/2004 | Gustavsson et al. |
| 6,725,317 B1 | 4/2004 | Bouchier et al. |
| 6,728,958 B1 | 4/2004 | Klein et al. |
| 6,742,015 B1 | 5/2004 | Bowman-Amuah |
| 6,779,016 B1 | 8/2004 | Aziz et al. |
| 6,816,903 B1 | 11/2004 | Rakoshitz et al. |
| 6,816,905 B1 | 11/2004 | Sheets et al. |
| 6,820,171 B1 | 11/2004 | Weber et al. |
| 6,826,709 B1 | 11/2004 | Clermidy et al. |
| 6,832,238 B1 | 12/2004 | Sharma et al. |
| 6,839,700 B2 | 1/2005 | Doyle et al. |
| 6,842,906 B1 | 1/2005 | Bowman-Amuah |
| 6,853,642 B1 | 2/2005 | Sitaraman et al. |
| 6,871,210 B1 | 3/2005 | Subramanian |
| 6,877,035 B2 | 4/2005 | Shahabuddin et al. |
| 6,898,642 B2 | 5/2005 | Chafle et al. |
| 6,901,442 B1 | 5/2005 | Schwaller et al. |
| 6,938,256 B2 | 8/2005 | Deng et al. |
| 6,950,848 B1 | 9/2005 | Yousefi'zadeh |
| 6,952,401 B1 | 10/2005 | Kadambi et al. |
| 6,963,915 B2 | 11/2005 | Karger et al. |
| 6,973,517 B1 | 12/2005 | Golden et al. |
| 6,985,967 B1 | 1/2006 | Hipp |
| 6,986,139 B1 | 1/2006 | Kubo |
| 7,032,241 B1 | 4/2006 | Venkatachary et al. |
| 7,051,098 B2 | 5/2006 | Masters et al. |
| 7,051,188 B1 | 5/2006 | Kubala et al. |
| 7,055,052 B2 | 5/2006 | Chalasani et al. |
| 7,080,051 B1 | 7/2006 | Crawford |
| 7,085,837 B2 * | 8/2006 | Kimbrel et al. ............... 709/226 |
| 7,099,981 B2 | 8/2006 | Chu |
| 7,140,020 B2 | 11/2006 | McCarthy et al. |
| 7,146,446 B2 | 12/2006 | Chu |
| 7,185,112 B1 | 2/2007 | Kuranari et al. |
| 7,228,546 B1 | 6/2007 | McCarthy et al. |
| 7,289,964 B1 | 10/2007 | Bowman-Amuah |
| 7,328,297 B2 | 2/2008 | Chu |
| 7,356,602 B2 | 4/2008 | Goldszmidt et al. |
| 7,363,415 B2 | 4/2008 | Chu |
| 7,363,416 B2 | 4/2008 | Chu |
| 7,376,779 B2 | 5/2008 | Chu |
| RE41,092 E | 1/2010 | Chu |
| 7,676,624 B2 | 3/2010 | Chu |
| 7,693,993 B2 | 4/2010 | Sheets et al. |
| 7,730,172 B1 | 6/2010 | Lewis |
| 7,764,683 B2 | 7/2010 | DiGiorgio et al. |
| 7,844,513 B2 | 11/2010 | Smith |
| 2001/0039581 A1 | 11/2001 | Deng et al. |
| 2002/0007468 A1 | 1/2002 | Kampe et al. |
| 2002/0083078 A1 | 6/2002 | Pardon et al. |
| 2002/0091854 A1 | 7/2002 | Smith |
| 2002/0107877 A1 | 8/2002 | Whiting et al. |
| 2002/0124083 A1 | 9/2002 | Jeyaraman et al. |
| 2003/0037092 A1 | 2/2003 | McCarthy et al. |
| 2003/0039237 A1 | 2/2003 | Forslow |
| 2004/0162901 A1 | 8/2004 | Mangipudi et al. |
| 2005/0076214 A1 | 4/2005 | Thomas et al. |
| 2005/0182838 A1 | 8/2005 | Sheets et al. |
| 2006/0129687 A1 | 6/2006 | Goldszmidt et al. |
| 2007/0140242 A1 | 6/2007 | DiGiorgio et al. |
| 2010/0268827 A1 | 10/2010 | Sheets et al. |
| 2011/0191462 A1 | 8/2011 | Smith |
| 2011/0238564 A1 | 9/2011 | Lim et al. |

FOREIGN PATENT DOCUMENTS

| | | |
|---|---|---|
| CN | 01812619.7 | 11/2006 |
| EP | 0833514 A2 | 4/1998 |
| EP | 0844577 A2 | 5/1998 |
| EP | 0844577 A3 | 2/1999 |
| EP | 0873009 B1 | 11/2005 |
| EP | 1 091 296 A2 | 4/2011 |
| JP | 11027635 A | 1/1999 |
| JP | 11-120127 A | 4/1999 |
| JP | 2000-040115 | 2/2000 |
| JP | 2002-132741 | 5/2002 |
| JP | 2002-202959 | 7/2002 |
| JP | 2002-245017 | 8/2002 |
| JP | 2004-082911 | 3/2004 |
| JP | 2004-519749 A | 7/2004 |
| KR | 0840960 | 6/2008 |
| WO | WO 00/04458 A1 | 1/2000 |
| WO | WO 00/14634 A1 | 3/2000 |
| WO | WO 01/67707 A2 | 3/2001 |
| WO | WO 02/01347 A2 | 1/2002 |
| WO | WO 02/07037 A1 | 1/2002 |
| WO | WO 02/08891 A2 | 1/2002 |

OTHER PUBLICATIONS

Web site print-out: rackspace.com; 2 pgs.; Copyright 2000.
Management of the Access Network and Service Provisioning, Jani Hursti, Seminar in Networking, Helsinki University of Technology, 20 pgs.; Apr. 1999.
Web site print-out: Luminate Introduces Luminate.Net e-Service, Luminate, Inc., 2 pgs.; Copyright 2000.
A New Twist on Hosting: Luminate Pitches Its Enterprise Management Services, Chris Gonsalves, PC Week Online, 2 pgs.; Mar. 2000.
Web site print-out: Lightspeed Systems, Corporate Overview, 3 pgs., Copyright 1999.
Web site print-out: USi Complex Web Hosting Solution and Lattice Communications, Usinternetworking, Inc., 2 pgs., 2001.
Web site print-out: table of contents and chapter abstracts for—ISP Survival Guide: Stratetgies for Running a Competitive ISP, Geoff Huston, Wiley Computer Publishing, 16 pgs.; Oct. 1998.
Web site print-out: Remedy AR System Integration Module for PATROL, BMC Software, Inc., 2 pgs., Copyright 2001.
Web site print-out: PATROL® SRM: The Foundation of Application-Centric Storage Management®, BMC Software, Inc., 2 pgs.; Copyright 2001.
Web site print-out: PATROL® for Performance Management-Prediction in Action, BMC Software, Inc., 2 pgs.; Copyright 2001.
Web site print-out: Frequently Asked Questions—Overview of PATROL®, BMC Software, Inc., 4 pgs.; Copyright 2001.
Excite@Home Launches Free Service for Merchants, Andrea Orr, MicroTimes Magazine, plus web site print-out; 3 pgs.; Aug. 2000.
Web site print-out: Ascendant Solutions, Inc. Fact Sheet, Ascendant Solutions, Inc.; 4 pgs.; Copyright 1998-2000.
Web site print-out: Comprehensive Hosting Solution for ISVs, ebaseone Corporation, 3 pgs.; Copyright 2000.
The Landlords of Cyberspace, Christopher Heun, informationweek.com; 3 pgs.; Jul. 2000.
Magazine advertisment: ISP Upgrade, CAIS Software Solutions, 3 pgs.; Copyright 1999.
Brochure: Applicast™, Applicast, Inc.; 6 pgs.; Copyright 1999.
Web site print-out: ASP Computer Systems Corp.; Data Return Corporation, 3 pgs.; Copyright 2000.
White Paper: Stratus ftServers: Enhancing Software Reliability and Availability for Windows 2000, Stratus Computer Systems; 10 pgs.; Copyright 2000.
Web site print-out: Cellular MultiProcessing—Breakthrough Architecture for an Open Mainframe, Unisys, 4 pgs.; Copyright 2000.
Web site print-out: ClearPath Enterprise Servers—What is HMP?, Unisys, 2 pgs.; Copyright 2000.
Brochure: HP OpenView Customer Views 1.0 for Network Node Manager, Hewlett-Packard Company, 4 pgs.; Copyright 1999.
Brochure: Get Connected—Cable & Wireless Enhanced Solutions Provider Program, Cable & Wireless USA, Inc., 4 pgs.; Copyright 1999.
Web site print-out: Resonate®, Resonate, Inc.; 1 pg.; Copyright 1999.
Web site print-out: ISP Power Overview, inovaware.com, Inovaware Corporation; 2 pgs.; copyright 1997-2000.
Web site print-out: XaCCT Offers Multivendor, Multitechnology Billing Model for ISP Consumption, John Morency, Network World Fusion on Network/Systems Management, Network World, Inc.; 3 pgs., Sep. 1998.
Web site print-out: Internet Shock Absorber, Cable and Wireless plc., 5 pgs.; Copyright 2000.
Web site print-out: Epoch Internet Introduces New 'POD' Architecture, An Innovative Approach to Providing Web Hosting Services, epoch.net, Epoch Networks, Inc., 4 pgs.; Copyright 2000.
Web site print-out: Frequently Asked Questions—Complex Web Services, USinternetworking, Inc.; 3 pgs.; Copyright 1998-1999.

Brochure: ControlIT™—Remote Control Without Boundaries, Computer Associates International, Inc.; 10 pgs.; Copyright 2000.
Brochure: HP OpenView, Hewlett-Packard Company, 16 pgs.; Copyright 1999.
White Paper: The HP OpenView Approach to Change and Configuration Management, Hewlett-Packard Company, 23 pgs.; Copyright 1999.
Web site print-out: End to End Scheduling for Tivoli® Workload Scheduler and Tivoli Operations Planning and Control, Tivoli Systems, Inc.; 2 pgs., 2004.
Web site print-out: White Paper: Tivoli Service Provider Solutions, Tivoli Systems, Inc.; 24 pgs.; Copyright 1999.
Brochure: Tivoli® Global Enterprise Manager—A Business-focused Approach to Systems Management, Tivoli Systems, Inc.; 4 pgs.; Copyright 2000.
Brochure: Tivoli® Cross-Site for Security, Tivoli Systems, Inc.; 4 pgs.; Copyright 2000.
Brochure: Tivoli® Cross-Site for Deployment—Using the Internet as a Valuable Deployment Tool, Tivoli Systems, Inc.; 4 pgs.; Copyright 2000.
Brochure: Tivoli® Cross-Site for Availability, Tivoli Systems, Inc.; 4 pgs.; Copyright 1999.
Brochure: Tivoli Problem Management Suite, Tivoli Systems, Inc.; 4 pgs.; Copyright 1999.
Brochure: Tivoli® Distributed Monitoring—Automated, Consistent Availability Solution, Tivoli Systems, Inc.; 4 pgs.; Copyright 2000.
Brochure: Tivoli Technical Brief for Service Providers, Tivoli Systems, Inc., 7 pgs.; Copyright 1999.
Brochure: Tivoli Cross-Site—Internet Application Management Technical Brief, Tivoli Systems, Inc.; 22 pgs.; Copyright 1999.
Cabrera, et al., "ADSM: A multi-Platform, Scalable, Backup and Archive Mass Storage System", IBM Research Division, 1063-6390/95 @ 1995 IEE, Almadden Research, 650 Harry Road, San Jose, CA 95120-6099, 1995.
ADSM: A Multi-Platform, Scalable, Backup and Archive mass Storage System; Luis-Felipe Cabrera et al.; 1063-6390/95, 1995 IEEE; pp. 420-427.
Web site print-out; Coblat RaQ, Cobalt Network Systems; 2 pgs. © 2001.
Web site print-out: HP'S Answer for Portal Performance—A—class Servers; Hewlett-Packard Company, 2 pgs. © 2000.
White paper: IBM Netfinity X-architecture, IBM Corporation; 22 pgs.; © 1998.
Brochure: ChatCom's ChatterBox Products, ChatCom, Inc.; 2 pgs. Undated.
Application and File History of U.S. Appl. No. 09/709,820, filed Nov. 10, 2000, now U.S. Patent No. 6,452,809, issued Sep. 17, 2002, Inventors Jackson et al.
Application and File History of U.S. Appl. No. 09/710,095, filed Nov. 10, 2000, now U.S. Patent No. 6,816,905, issued Nov. 9, 2004, Inventors Sheets et al.
Application and File History of U.S. Appl. No. 09/765,766, filed Jan. 18, 2001, now U.S. Patent No. 6,938,256, issued Aug. 30, 2005, Inventors Deng et al.
Application and File History of U.S. Appl. No. 09/907,520, filed Jul. 17, 2001, Inventor Smith.
Application and File History of U.S. Appl No. 10/244,450, filed Sep. 16, 2002, now U.S. Patent No. 6,606,253, issued Aug. 12, 2002, Inventors Jackson et al.
Application and File History of U.S. Appl. No. 10/984,959, filed Nov. 8, 2004, now U.S. Patent No. 7,693,993, issued Apr. 6, 2010, Inventors Sheets et al.
Application and File History of U.S. Appl. No. 12/748,063, filed Mar. 26, 2010, Inventors Sheets et al.
Epema et al., A worldwide flock of Condors: Load sharing among workstation clusters, Future Generation Computer Systems 12 (1996) pp. 53-65.
Evers, Condor Flocking: Load Sharing between Pools of Workstations, Apr. 1993; 63 pages.
Zhou et al., Utopia: a Load Sharing Facility for Large, Heterogeneous Distributed Computer Systems, Software—Practice and Experience, vol. 23(12), pp. 1305-1336 (Dec. 1993).

Ferstl, Job and resource-management systems in heterogeneous clusters, GENIAS Software GmbH, Sep. 1995, pp. 39-51.
Damani et al., ONE-IP: techniques for hosting a service on a cluster of machines, Computer Networks and ISDN Systems 29 (1997), pp. 1019-1027.
Sue Mazingo, Internet Server Load Balancing, Digital Systems Report; Summer 1999; 21, 2; Sciences Module, p. 27.
Ludmila Cherkasova, Scalable Web Hosting Service, HP Laboratories Palo Alto, HPL-1999-52(R.1) Oct. 1999, pp. 1-26.
Ludmila Cherkasova, FLEX: Design and Management Strategy for Scalable Web Hosting Service, HP Laboratories Palo Alto, HPL-1999-64(R.1) Oct. 1999, pp. 1-38.
Evans & Butt, Load balancing with network partitioning using host groups, Parallel Computing 20 (1994), pp. 325-345.
Marco Pistoia & Corinne Letilley, IBMWebSphere Performance Pack: Load Balancing with IBM SecureWay Network Dispatcher, IBM Corp., Oct. 1999, 438 pages.
Alexandrov et al., Quality of Service management of the World Wide Web, Distributed Computing Networks Department, St. Petersburg, Russia, 23 pages.
Eberle & Oertli, Switcherland: A QoS Communication Architecture for Workstation Clusters, Swiss Federal Institute of Technology (ETH) IEEE Int. Symp on Computer Architectures, Jul. 1998, 12 pages.
Matta, On Network Resource Management for End-to-End QoS, Computer Science Department Boston University (1999), 20 pages.
Pandey et al., Supporting Quality of Service in HTTP servers, (ACM Symp. on Principles of Distributed Computing) Parallel and Distributed Computing Laboratory Computer Science Department, 1998, 11 pages.
Michael Cooney, IBM seeks to ease server load, Network World, Southborough: Jun. 16, 1997. vol. 14, Iss. 24; p. 16, 2 pages.
Jaruzelski et al., ASP 101: Understanding the Application Service Provider Model, Booz Allen & Hamilton, Jul. 2000, 12 pages.
Gerhard Mourani, Get Acquainted with Linux Security and Optimization System, Open Network Architecture, ver. 1.1, Jan. 11, 2000, pp. 1-352.
Cameron & Patrick, BT WebWorld, BT Technol J vol. 15 No. 2, Apr. 1997, pp. 138-144.
BEA WebLogic Enterprise, Administration Guide, BEA Systems, Inc., ver. 5.1, May 2000, 395 pages.
Radha Subrahmanyan, Performance monitoring of the Apache Web Server, Masters Thesis, University of Ottawa, Ontario, 1999, 77 pages.
Beth Snyder, Wired Digital adds commerce to site, Advertising Age v68, n39 (Sep. 29, 1997): 38.
Clinton Wilder, Firmbuy offers hosted procurement site, Informationweek, n772 (Feb. 7, 2000): 101.
Ubrandit.com allows anyone to operate an online business, Direct Marketing v62, n8 (Dec. 1999): 8.
Lee Copeland, Online car market revs up, ComputerWorld v34, n5 (Jan. 31, 2000):10.
Cathy Taylor, Stop 'n shop with C/Net, Mediaweek v6, n37 (Sep. 9, 1996): 12.
Reexam Application No. 90/011783, filed Jul. 1, 2011, Assignee Galactic Computing Corporation BVI/IDC.
Reexam Application No. 90/011784, filed Jul. 28, 2011, Assignee Galactic Computing Corporation BVI/IDC.
EP Application No. 01952274.7, filed Jun. 28, 2011, Applicant Galactic Computing Corp BV, Examination Report dated Jun. 15, 2010, 5 pages.
EP Application No. 01952274.7, filed Jun. 28, 2011, Applicant Galactic Computing Corp BV, Examination Report dated Apr. 1, 2008, 7 pages.
EP Application No. 01952274.7, filed Jun. 28, 2011, Applicant Galactic Computing Corp BV, Supplemental European Search Report, dated Dec. 3, 2007, 3 pages.
Japanese Application No. 2002-512872, filed Jun. 28, 2001, Applicant Galactic Computing Corp BV, Decision of Refusal, dated Nov. 2, 2010, 2 pages.
Japanese Application No. 2002-512872, filed Jun. 28, 2001, Applicant Galactic Computing Corp BV, Notifications of Reason(s) for Refusal, dated Oct. 6, 2009, 6 pages.

Canadian Application No. 2,415,770, filed Jun. 28, 2011, Applicant Galactic Computing Corp BV, Examination Report, dated Apr. 27, 2007, 2 pages.
Canadian Application No. 2,415,770, filed Jun. 28, 2011, Applicant Galactic Computing Corp BV, Examination Report, dated Dec. 22, 2004, 4 pages.
Application and File History of U.S. Appl. No. 13/192,342, filed Jul. 27, 2011, Inventors Smith.
PCT/US2001/20571, filed Jun. 28, 2001, Applicant Galactic Computing BV, International Preliminary Examination Report, dated Jan. 14, 2004, 3 pages.
PCT/US2001/20571, filed Jun. 28, 2001, Applicant Galactic Computing BV, Search Report, dated Oct. 15, 2001 2 pages.
Boot Integrity Services Application programming Interface, Intel Corporation, ver. 1.0, Dec. 28, 1998, 64 pages.
Cluster Computing White Paper, Mark Baker, University of Portsmouth, ver. 1.0b, Apr. 10, 2000, 64 pages.
Cluster Computing White Paper, Mark Baker, University of Portsmouth, ver. 2.0b, Dec. 28, 2000, 119 pages.
Preboot Execution Environment (PXE) Specification, ver. 2.1, Intel Corporation, Sep. 20, 1999, 103 pages.
Wired for Management Baseline, Intel Corporation, ver. 2.0, Dec. 18, 1998, 119 pages.
Devlin et al., Scalability Terminology: Farms, Clones, Partitions, and Packs: RACS and RAPS, Microsoft Corp., Technical Report MS-TR-99-85, Dec. 1999, 9 pages.
Morjan, Distributed Image Management (DIM) for Cluster Administration, IBM, Inc., 1996, 10 pages.
Kapadia & Fortes, PUNCH: an architecture for Web-enabled wide-area network-computing, Cluster Computing 2, School of Electrical and Computer Engineering Purdue University, (1999) pp. 153-164.
Barak & La'adan, The MOSIX multicomputer operating system for high performance cluster computing, Future Generation Computer Systems 13 (1997/1998) pp. 361-372.
Thekkath et al., Frangipani: A Scalable Distributed File System, 1997 ACM, Systems Research Center Digital Equipment Corporation, pp. 224-237.
Stelling et al., A fault detection service for wide area distributed computing, Cluster Computing, 1999, pp. 117-128.
William E. Snaman, Jr., Application Design in a VAXcluster System, Digital Technical Journal vol. 3 No. 3 Summer 1991, pp. 1-10.
Rome Laboratory Software Engineering Cooperative Virtual Machine, Air Force Materiel Command, RL-TR-94-221, Dec. 1994, 73 pages.
Friedman, et al., Symphony: managing virtual servers in the global village, Department of Computer Science, Euro-Par 1999, LNCS 1685, pp. 777-784.
Sun Enterprise 10000 Server (Starfire), Technical White Paper, Sun Microsystems, Sep. 1998, pp. 1-32.
Ultra™ Enterprise™ 10000 Server: SunTrust™ Reliability, Availability, and Serviceability, Technical White Paper, Sun Microsystems, 1997, 36 pages.
Hohman, ArrowPoint to give Web switch Gigabit Ethernet boost, Network World, Southborough: May 10, 1999. vol. 16, Iss. 19; p. 24, 2 pgs.
Memo, Intel Preboot Execution Environment, Intel Corporation, Dec. 1999, 17 pages.

Katz et al., A Scalable HTTP Server: The NCSA Prototype, Computer Networks and ISDN Systems 27 (1994), 10 pages.
Reexam Application No. 90/011783, filed Jul. 1, 2011, Assignee Galactic Computing Corporation BVI/IDC, Request for Ex Parte Reexamination, 132 pages.
Reexam Application No. 90/011784, filed Jul. 28, 2011, Assignee Galactic Computing Corporation BVI/IDC, Request for Ex Parte Reexamination, 247 pages.
ISP Survival Guide: Strategies for Running a Competitive ISP, Geoff Huston, (© 1999). 617 pages (5 Parts (Chap. 1-4; Chap. 5-8; Chap. 9-12; Chap. 13-16; Glossary)).
Application and File History of U.S. Appl. No. 12/957,026, filed Nov. 30, 2010, Inventors Smith.
U.S. Ex Parte Reexamination Application No. 90/011,784, filed Jul. 28, 2011, Office Action in Ex Parte Reexamination dated Dec. 1, 2011, 30 pages.
U.S. Ex Parte Reexamination Application No. 90/011,784, filed Jul. 28, 2011, Petition Under 37 CFR 1.182, filed Feb. 22, 2012.
"Simplified Guide to the Java TM 2 Platform Enterprise Edition," Sun Microsystems, Inc., 1999, 20 pages.
BEA WebLogic Enterprise 5.1, BEA Systems, Inc., 2000, pp. 1-367.
Breitbart et al., "Replication and Consistency Being Lazy Helps Sometimes," Pods '97, Jun. 1997, pp. 173-184.
Dogac et al., "METU Interoperable Database System," Demo Description, in Proc. of ACM Sigmod Intl. Conf. on Management of Data, Jun. 1996, 6 pages.
Efficient and Flexible Methods for Transient Versioning of Records to Avoid Locking by Read-Only Transactions, 1992 ACM SIGMOD, Jun. 1992, pp. 124-133.
Govil K. et al: "Cellular Disco: Resource Management using Virtual Clusters on Shared-Memory Multiprocessors" Computer Systems Laboratory, Stanford University, Dec. 1999, pp. 154-169.
Initial Context, JNDI 1.2.1 Specification: Class Initial Context, Jul. 14, 1999, pp. 1-21.
iPlanet Application Server 6.0 Administration Guide: Chapter 4 Logging Server Messages, Sep. 5, 2000, pp. 1-17.
iPlanet Application Server 6.0 Administration Guide: Chapter 9 Administering Transactions, Sep. 5, 2000, pp. 1-24.
R. J. Abbott, Resourceful Systems and Software Fault Tolerance, ACM 0-89791-271-3/88/0006, pp. 992-1000, 1988.
Ravindran et al., Resource Management MiddleWare for Dynamic, Dependable Real-Time Systems, Real-Time Systems, 2000, pp. 1-15.
S. Han, at al., Fast Restoration of Real-Time Communication Service from Component Failures in Multi-hop Networks, Proc. of ACM SIGCOMM Symposium, vol. 27, No. 4, pp. 77-88, (Oct. 1997).
Stelling, et al. A fault detection service for wide area distributed computations, Journal Cluster Computing, 1999, pp. 1-11.
T. Wu, A Passive Protected Self-Healing Mesh Network Architecture and Applications, IEEE, ACM Transactions on Networking, vol. 2 No. 1 pp. 40-52 (Feb. 1994).
Tierby B et al., "A network-aware distributed storage cache for data intensive environments," High Performance Distributed Computing, 1999, pp. 1-9.

* cited by examiner

SYSTEM FOR BALANCE DISTRIBUTION OF REQUESTS ACROSS MULTIPLE SERVERS USING DYNAMIC METRICS

RELATED APPLICATIONS

This application claims priority as continuation to U.S. patent application Ser. No. 09/765,766, filed Jan. 18, 2001, now U.S. Pat. No. 6,938,256, which claims the benefit of U.S. Provisional Application No. 60/176,665, filed Jan. 18, 2000, both of which are incorporated herewith by reference. This application is also related to two applications that are assigned to the common assignee of the present application, the first of which is entitled "Scalable Internet Engine," Ser. No. 09/709,820, filed Nov. 10, 2000, now U.S. Pat. No. 6,452,809, and the second of which is entitled "Method and System For Providing Dynamic Host Service Management Across Disparate Accounts/Sites," Ser. No. 09/710,095, filed Nov. 10, 2000, now U.S. Pat. No. 6,816,905.

FIELD OF THE INVENTION

This invention relates to computers and digital processing systems requiring coordination of multiple digital processing units. In particular, this invention relates to load balancing or distribution of client requests across multiple servers in a networked computing environment.

BACKGROUND OF THE INVENTION

The Internet has become an increasingly useful tool and means of communication to many people. As the popularity of the Internet has increased, traffic to many Internet service provider (ISP) and application service provider (ASP) sites has become so congested at times that many companies have to impose a limit on the number of users using their sites during peak hours. As a result, a significant loss of business for e-business merchants, user dissatisfaction, and a permanent loss of many potential customers occur. According to at least one source, during the 1999 holiday shopping season, 25 percent of all potential online buyers never completed their online purchases because the e-tail sites of interest had either crashed or were simply too slow. The principle cause of these problems in the case of larger sites was and is an inappropriate distribution of the requests of customers or users (clients) among the sites' resources (servers), namely the multiple content and application servers that are responsible for responding to these requests.

Allocating content and application server resources to respond to a large number of client requests can become rather complex in certain circumstances involving multiple servers at a given site. If it is assumed that there is always at least one server available for each new task that arises, resource assignments may be made in an arbitrary manner, making the resource allocation procedure trivial. To satisfy the assumption underlying this approach to resource allocation, it is generally desirable to create a system design that has abundant resources and strives to conserve them to maintain availability and efficient throughput. In this approach, each client request received at a site is handled as an independent event. U.S. Pat. Nos. 6,173,322, 6,070,191, 5,999,965, and 5,504,894 all describe resource demand distribution schemes that allocate client request among various resources where the client requests are each treated as independent events.

U.S. Pat. No. 6,173,322 is a good example of this approach and describes a system comprised of three host servers each having different request handling capabilities. For illustrative purposes, suppose that hosts H1, H2, and H3 have capabilities C1, C2, and C3 respectively with C3 being the most capable. Further suppose that there are three requests pending, R1, R2, and R3, needing capabilities C1, C2, and C3 respectively. If each request is considered independently and in the order the requests arrive, R1 might be assigned to H3 since this host will serve the request with the least delay. Next, R2 might be assigned to H2 for the same reason. R3 would then suffer if it were assigned to the only remaining host, H1, since H1 is under-powered to handle the request. Alternatively, R3 could wait for H3 to become available. The effect of these kinds of inefficiencies is cumulative; if the same three requests (or their respective equivalents) come in repeatedly and are serviced independently, there will be an ever-diminishing availability of resources until the system saturates and stops responding to new requests. Moreover, Internet demand is not well behaved. Service requests often come in bursts or may back up to form a large backlog for a variety of reasons. As a consequence, it is desirable for the resource allocation procedure to respond in a more sophisticated manner.

Another problem of the request distribution processes described in U.S. Pat. Nos. 6,070,191, 5,999, 965, and 5,504, 894 is that these processes consider only parameters related to available resources and do not consider the attributes of the incoming client requests. U.S. Pat. No. 6,173,322 parses certain data contained in incoming clients requests, but only for the purpose of applying a static rule to distribute the requests to one of several server groups. Once this has been done, dynamic resource capability rules are applied to assign the request to a server within the group. These rules may operate in consideration of the static rules previously applied, but only after the static rules are first applied.

While existing schemes for distributing client requests among multiple servers have begun to address some of the problems that arise, it would be desirable to provide a system for distributing client requests across multiple servers that was more efficient and robust. Specifically, it would be advantageous to provide a system for distributing client requests across multiple servers that analyzed the attributes of client requests for expected demand patterns with which resource requirements may be associated, allowing for a comparison of the resource needs of incoming client requests with the resources available, and thus improving the capability of the resource allocation scheme to be more adaptive and dynamic from all operating aspects.

SUMMARY OF THE INVENTION

The present invention is a system for distributing incoming client requests across multiple servers in a networked client-server computer environment. The system collects information on both the attributes of the requests and the resource capability of the servers to dynamically allocate the requests in a set to the appropriate servers upon the completion of the time interval. Preferably, the system includes a request table to collect at least two requests incoming within a predetermined time interval. A request examiner routine analyzes each collected request with respect to at least one attribute. A system status monitor collects resource capability information of each server in a resource table at least once during said time interval. An optimization and allocation process distribute collected requests in the request table across the multiple servers upon completion of said time interval based on an optimization of potential pairings of the requests in the request table with the servers in the server table. The optimization and allocation process preferably analyzes metrics maintained in the request table and resource table as part of a relational database to allocate requests to servers based on a minimization of the metric distance between pairings of requests and servers. Preferably, the request table is part of a dynamic, relational database and a process of statistical inference for ascertaining expected demand patterns involving the attributes adds predictive information about client requests as part of the request examiner routine.

The present invention responds to the demanding circumstances described above by shifting from processing each request as an independent event to processing as a set of requests incoming within a predetermined time interval. The requests are processed as a set by collecting the requests incoming within the predetermined time interval, analyzing each of these requests with respect to at least one attribute, collecting at least once during the time interval information about each server's ability and availability, i.e., resource capability information, to handle requests, and distributing the set of requests across the multiple servers upon the completion of the time interval in response to the above actions, and then repeating these steps for each consecutive time interval. This invention has been denominated virtual extended technology (VXT) because it can intelligently run in the background within the confines of current day bandwidth and processing technology.

Resource allocation, the key to optimum throughput, is the real-time intelligent management of system resources. This invention utilizes several interactive decision processes that can consider all operating aspects of a system's resources, both static and dynamic, while balancing the continuously changing competition for these resources. One of the objectives of this invention is to provide a new algorithm for allocating Internet client requests in an intelligent manner to multiple servers to maximize the efficiency and fault tolerance of the resources. Costs of requests within a reasonable time interval are considered simultaneously to produce a solution that is globally effective (i.e., most effective for a site as a whole) at the possible expense of some individual (localized) requests. The objective is further achieved through analysis of attributes of requests as these attributes correlate to request demands on resources and of the just-in-time running status of those resources.

To return to the above example, a more effective solution would look at all three requests simultaneously, and assign R1 to H1, R2 to H2, and R3 to H3. The performance associated with request R1 will receive the nominal service (slightly less than that offered by the above solution) it needs, while R3 will also receive the appropriate level of service in a prompt manner, and the overall performance of the site will therefore be better. This latter solution is considered globally optimal because the number of requests managed per second is maximized and the collective resources are available for the next set of requests sooner.

Requests to a site can vary widely from web surfing, product search, price comparison, and checkout to multimedia access. However, the demand on resources by each kind of request is predictable. The distribution decision-making process of this invention accounts for attributes and behavior of incoming requests and the corresponding compatibility of system hardware and software. Incoming client requests are analyzed to determine their attributes and behavior so that a given request's expected demand on resources can be predicted and resource requirements can be assigned to the request.

One of the components of the invention will perform the extraction of the attributes from incoming requests. An analysis of the effectiveness of the characteristics above as well as the identification of other parameters that may be beneficial can be performed during the requirements analysis task. Extraction of the dynamic attributes will be performed in real-time by VXT's integral system request examiner or status monitor.

The invention learns how to characterize site-specific traffic in several ways. First, it expands or contracts the number of expected demand patterns based on the success of the request classification. In other words, if a live request does not sufficiently match an already existing pattern, a new pattern is created. Also, if the resource requirement parameters for the matching entry are not correct as measured by system experience, either the parameters themselves are adjusted, or a new pattern is created. Conversely, the number of patterns is constrained to minimize the computation required to classify live requests. The pattern set may be reorganized to eliminate unused, redundant, or ineffective entries. This self-organizing and reorganizing paradigm refines parameters by experience and remains vigilant to non-stationary statistical trends.

Similarly, the compatibility of the system hardware and software is also provided to the decision-making process. Some of these characteristics are static and known in advance, while others are dynamic and a function of the tasks currently executing. Preferably, a collection of resource capability information for each server includes metrics for CPU and memory availability and connectivity to a proxy server, to a main storage system, and to other content servers. This collection process can be push or pull from the server at certain times and any of several techniques can be implemented for minimal interruption of the main execution on the servers. For example, information can be pulled periodically by the main proxy server, or the main server can be pushed to accept such information from servers when any certain parameter exceeds a pre-determined threshold. This performance feedback allows for an informed decision on which request to send to which server.

Once this information is captured for a given interval of time, it must be reduced to a metric representation that can be manipulated to compute the best assignments of client requests to resources. The metrics associated with each request form a requirement data set whose elements represent the requirement level of each of the parameters used in the decision process. The metrics associated with the ability of a particular server to satisfy the request forms a capability data set with each element of this data set having a counterpart in the requirement data set. During operations, each request has its own requirement data set and each server or processing node has its own capability data set. The difference or metric distance between a requirement data set and a capability data set, calculated for any given pairing of client request and server, represents the mismatch (or cost) incurred by the corresponding assignment of the request to the server. If the data sets are identical, the cost is zero.

The assignment of multiple simultaneous requests can be done by one of several routines. The purpose of each routine, however, should be to select a server or processing resource for each client request so that the sum of all the costs, for the combination of resource and request pairings, is minimized. The solution can be found by using one of several algorithms.

Some algorithms find a perfect solution but require considerable processing, while others will find a nearly optimal solution quickly. Often, the nearly optimal solution is good enough to satisfy the presently existing circumstances.

One embodiment of the invention is a method for allocating a server selected from a plurality of servers to client requests originating over a predefined time interval at a plurality of user accounts, the method comprising: collecting a plurality of client requests that arrive within the predefined time interval wherein at least two of said client requests are serviceable by the server and wherein a first of said at least two of said client requests originates at a first user account and a second of said at least two of said client requests originates at a second user account; determining a first value of a cost metric for a first set of client request-server pairings wherein said first set includes at least one client request-server pair with said server being paired with either said first or said second of said at least two client requests; determining a second value of a cost metric for a second set of client request-server pairings wherein said second set includes at least one client request-server pair with said server being paired with both said first and said second of said at least two client requests; and at the end of said time interval distributing said client requests according to one of said first and said second set of client request-server pairings based on said first and second values of said cost metric.

A second embodiment is a method for distributing client requests across a plurality of servers in a client-server networked system, the method comprising: selecting a time window; collecting client requests arriving within said time window wherein said client requests include at least a first plurality of said client requests that originate at a first user account and at least a second plurality of client requests that originate at a second user account; determining a first cost metric corresponding to a first set of client request-server pairing wherein at least one server is paired with at least one of said first plurality of said client requests and at least one of said second plurality of client requests; determining a second cost metric corresponding to a second set of client request-server pairings wherein said second set is characterized by first and second disjoint subsets with all pairings that include client requests originating at the first user account belonging to the first subset and all pairings that include client requests originating at the second user account belonging to the second subset; and selecting one of said first set of client request-server pairs and said second set of client request-server pairs based on a differential between said first cost metric and said second cost metric.

One exemplary embodiment of the present invention includes a method for allocating a server, selected from a plurality of servers, to client requests originating over a predefined time interval at a plurality of user accounts. The method comprising: collecting a plurality of client requests that arrive within the predefined time interval wherein at least two of said client requests are serviceable by the server and wherein a first of said at least two of said client requests originates at a first user account and a second of said at least two of said client requests originates at a second user account; determining a first value of a cost metric for a first set of client request-server pairings wherein said first set includes at least one client request-server pair with said server being paired with either said first or said second of said at least two client requests; determining a second value of a cost metric for a second set of client request-server pairings wherein said second set includes at least one client request-server pair with said server being paired with both said first and said second of said at least two client requests; and at the end of said predefined time interval distributing said client requests according to one of said first and said second set of client request-server pairings based on said first and second values of said cost metric; wherein the step of determining the first or the second value of a cost metric for the first or the second set of client request-server pairings further comprises the steps of: initializing the first or the second set of client request-server pairings at a commencement of the predefined time interval; a) selecting a client request-server pair to satisfy a selection criteria; b) creating a requirement vector corresponding to said client request; c) creating a capability vector corresponding to said server; d) calculating a distance between the requirement vector and the capability vector and adding said distance to a cumulative value when said distance exceeds a match threshold value and repeating steps a), b), c) and d); e) adding said client request-server pair to said set of client request-server pairings when said distance exceeds the match threshold value, said cumulative value is less than a cost threshold and said client request has arrived within said predefined time interval.

One exemplary embodiment of the present invention includes a method wherein the step of determining the value of the first or the second cost metric for the first or the second set of client request-server pairings comprises the steps of: at the commencement of said predefined time interval, initializing a cumulative value to zero; for each client request-server pair in the first or the second set of client request-server pairings, a) creating a requirement vector corresponding to said client request; b) creating a capability vector corresponding to said server; c) calculating an inner product of said requirement vector and said capability vector and adding said inner product to the cumulative value and repeating steps a), b) and c) for all client request-server pairs in the first or the second set of client request-server pairings whereupon said cumulative value represents the value of the cost metric.

One exemplary embodiment of the present invention includes a method step of distributing said client requests further comprises distributing said client requests according to said first set of client requests-server pairings if said first value of the cost metric is lower than the second value of the cost metric otherwise distributing said client requests according to said second set of client requests-server pairings.

One exemplary embodiment of the present invention includes a method wherein said selection criteria comprises matching a client request with a server to generate at least one client request-server pairing belonging to one of said first set and said second set.

One exemplary embodiment of the resent invention includes a s stem for distributing load within a client-server computer network, comprising: a plurality of interconnected computer servers, each server having at least one processor, wherein each computer server is associated with a capability vector having at least one element associated with a resource expected to be requested by at least one of a plurality of incoming client requests; a dynamic capability vector determining module adapted configured to generate a dynamic capability vector for each server of said plurality of interconnected servers, said dynamic capability vector representing an update to said capability vector such that the at least one element of the capability vector corresponds to an unused portion of the resource associated with the at least one element and measured at the commencement of one of a sequence of predefined time intervals; a requirement vector determining module configured to generate a requirement vector for each incoming client request during the one of the sequence of predefined time intervals; and a load balancing module for selectively pairing said plurality of interconnected computer servers with one or more of said plurality of incoming client requests so as to minimize a cost metric computed during the one predefined time interval in said sequence of predefined time intervals wherein said cost metric is a function of vector distances between said dynamic capability vectors and said requirement vectors associated with said computer servers and said client request pairs in said computer server-client request pairing; wherein said load balancing module further comprises a plurality of instances of load balancing modules resident on an appropriate plurality of servers disposed at intermediate nodes forming a connectivity hierarchy of layers throughout said client-server computer network such that said cost metric is computed and minimized for at least one layer of server nodes corresponding to the same connectivity hierarchy whereby each incoming client request is satisfied by a plurality of computer servers and transmission paths.

DESCRIPTION OF THE PREFERRED EMBODIMENT

Figure 2:
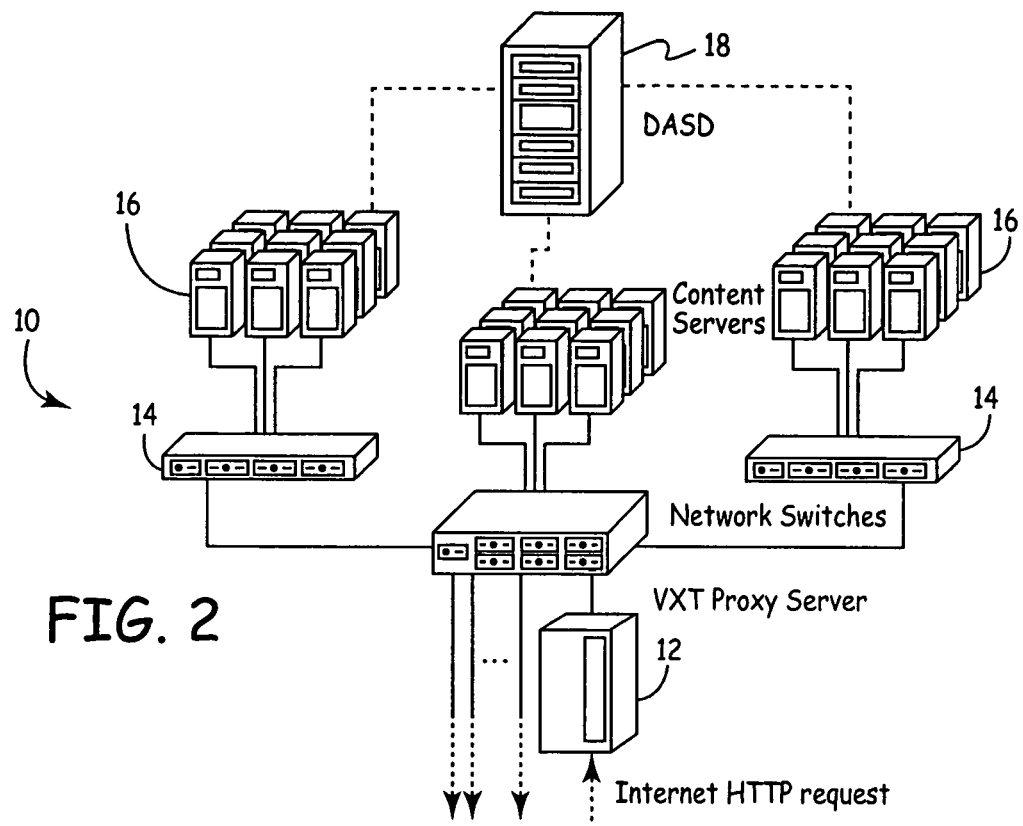
FIG. 2 is a diagrammatic view of the main interacting elements with a system with multiple servers for responding to client request, including a proxy server, content servers, switches, and storage system.

FIG. 2 shows a typical configuration of a system (10) having multiple resources that may be allocated to respond to client requests received from the Internet. A proxy server(s) (12) receives the client request from the Internet and using the VXT (100), as will be described shortly, distributes those requests via network switches (14) to one of the multiple content/application servers (16) which preferably have access to a common DASD storage unit (18) on which information pertinent to the client requests may be stored. As will be discussed in connection with FIG. 3, it will be understood that the present invention is applicable to numerous configurations of server resources in a system (10). In one embodiment as described in the previously identified applications entitled "Scalable Internet Engine" and "Method and System For Providing Dynamic Host Service Management Across Disparate Accounts/Sites", servers are dynamically allocated among multiple sites or accounts. In this embodiment, the present invention is applicable not only for allocating server resources among requests in a single account, but may also be extended to provide additional information for how to allocate servers among different accounts over time.

Figure 1:
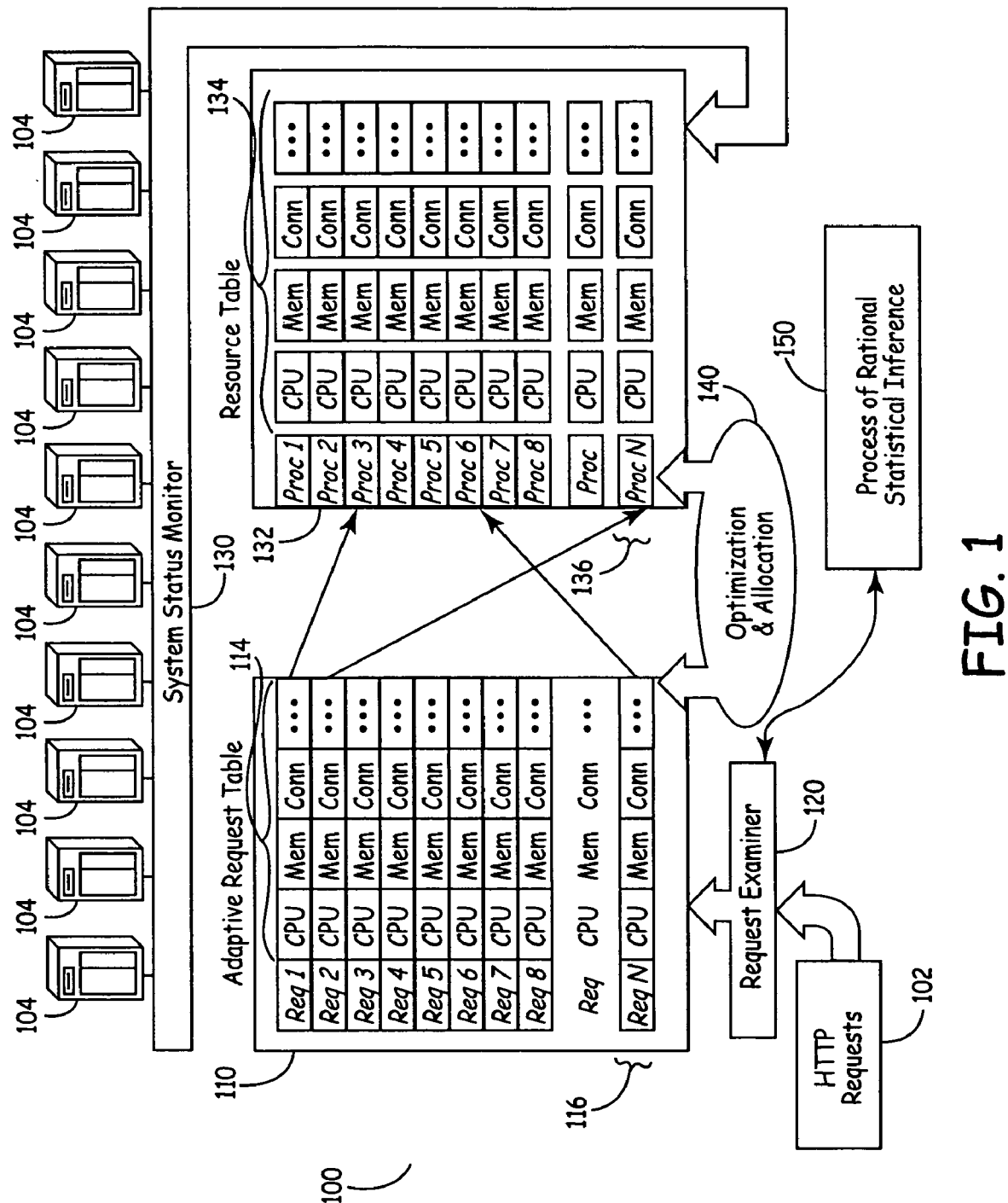
FIG. 1 is a diagrammatic view of the present invention implemented across servers in a networked computing environment.

In the preferred embodiment of the VXT (100) as shown in FIG. 1, the invention comprises a request table (110) to collect at least two requests (102) incoming within a predetermined time interval, a request examiner process (120) to analyze each said collected request with respect to at least one attribute, a system status monitor (130) to collect resource capability information of each server (104), an optimization and allocation process (140) to distribute said collected requests in the request table (110) across the multiple servers upon completion of said time interval in response to said attributes and said resource capability information. Incoming client requests (102) are analyzed for their respective attributes by the request examiner process (120). This attribute information is then sent to the request table (110). Preferably, the system status monitor (130) collects resource capability information as part of a resource table (132).

In a preferred embodiment, the request table (110) and the resource table (132) are preferably implemented as part of a relational database. A process of rational statistical inference (150) analyzes each client request to assign a pattern classification so that its expected demand on resources can be predicted using the pattern classification in the adaptive request table (110).

One of the primary responsibilities of the request examiner (120) of the VXT (100) is to examine all incoming requests and to prioritize these requests based on criteria that can be described in general as (1) categorical criteria such as product searching, price, comparison, online shopping, web surfing, audio streaming, and video downloads, and (2) demographic criteria such as the origin of the request and possible user profile. Comparing these attributes with a dynamic, relational database that records past requests and their behavior along with a process of rational statistical inference (150) permits the VXT (100) to estimate each client request's (102) resource requirements in terms of CPU availability, memory availability, and bandwidth or connectivity of the servers (104).

The purpose of the database and process of statistical inference (150) is to facilitate the construction of an adaptive request table (110) containing several generic request types or pattern classifications that are most likely to be received by the proxy server (12). Each request type is assigned a set of at least five parameters or resource requirement metrics (114) that reflect different requirement aspects for the respective request. The values assigned to these five parameters form a requirements vector (116) that prescribes the generic request's expected resource requirements in terms of CPU time, memory, bandwidth or connectivity for storage, bandwidth or connectivity to the main proxy server, and bandwidth or connectivity to peer servers (i.e., connectivity between content servers). When a request from the Internet comes in, the request examiner (120) compares the request with the patterns (112) contained in the adaptive request table (110), finds the closest match, and creates a requirement vector (116) including the five corresponding resource parameters.

Figure 3:
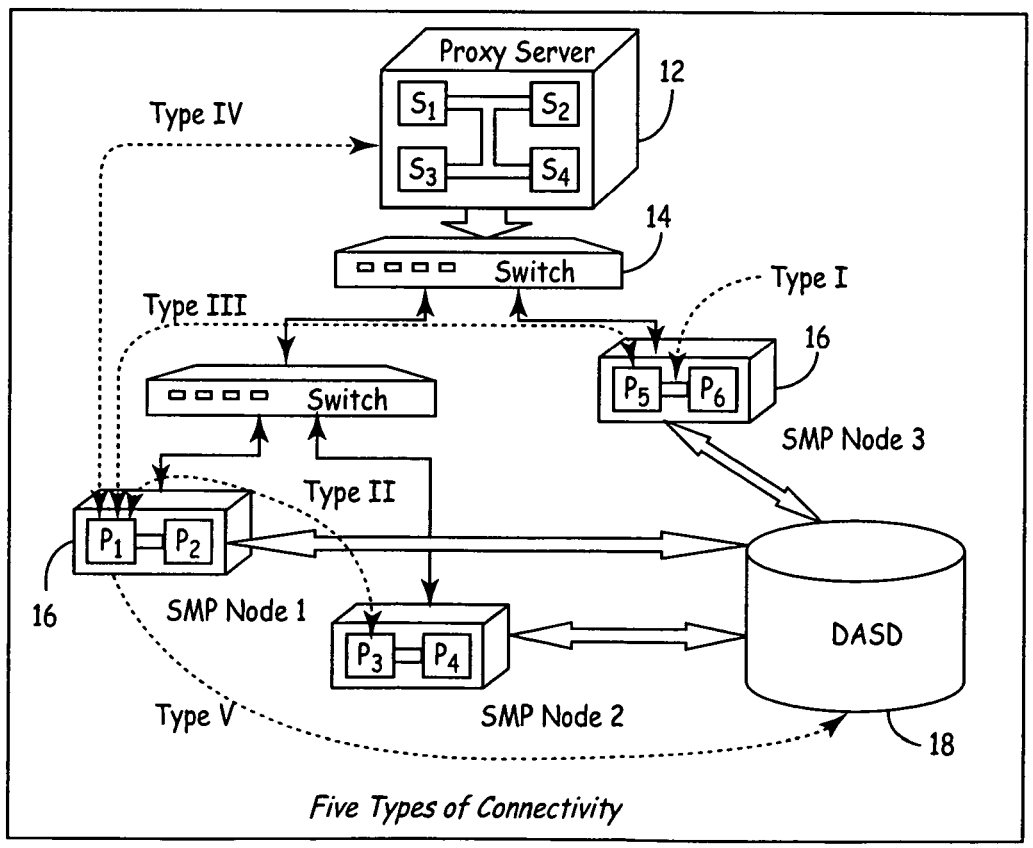
FIG. 3 illustrates five types of inter-processor connectivity for a system with multiple servers.

With reference to FIG. 3, a functional and cost effective system (10) should have at least two levels of networked servers. The lowest level consists of a collection of symmetric multiple processors (SMP) on the same bus. The bus should be a network having an aggregate bandwidth greater than 1 Gbps and very low latency. The next level is a collection of SMPs on one or more switches with less than 1 Gbps bandwidth and higher latency. The VXT (100) is designed to intelligently handle the added complexities of such an ASP system.

The VXT (100) ranks the available servers according to specific ranking criteria and servers' current running status in CPU availability, memory availability, storage connectivity, main proxy server connectivity, and pear server connectivity and generates a resource table (132) summarizing the resource capability metric (134) in a capability vector (136).

In a dynamic environment, each processor is capable of handling more than one task at a time, whether it is performing a price comparison or a search for a specific consumer item. The CPU availability parameter is defined in absolute terms as the unused portion of each processor's computing power measured in units of millions of instructions per second (MIPS).

The memory availability parameter is defined in absolute terms as the unused portion of each node's shared memory measured in units of megabytes divided by the number of processors in the node. This is because for SMP systems with several, processors (usually 4 to 8) in each node, the amount of memory available to one particular processor cannot be determined as the memory is shared among all processors in the same node.

Connectivity is a complex matter. In most systems, each processor has five different communication partners. Latency (determined by hardware) and available bandwidth (determined by current utilization) should be ascertained for each of these partners. Figure four identifies five types of inter-processor connectivity with a wide range of latency and bandwidth. Type I connectivity is between processors on the same node. Type II connectivity is between processors on different nodes, but on the same switch. Type III connectivity is between processors on different switches (for which a new parameter should be introduced to represent the number of hops to reach the partner processor). Type IV connectivity is between the processor and the proxy server. Type V connectivity is between the processor and the main storage system. Presently most ASP systems are not sophisticated enough to take advantage of the inter-processor connectivity information, i.e., Types II and III connectivity, so VXT (100) combines Types II and III connectivity into an aggregate connectivity. Three parameters are defined to represent available main proxy connectivity, central storage connectivity, and peer server connectivity. These parameters are bandwidths measured in units of Mbps recorded by the system status monitor.

Once all this information for incoming Internet requests and system resources is captured for a given time interval, it must be reduced to form a metric representation that can be manipulated to compute the best assignments of requests to resources. The metrics associated with each request forms a requirement vector (116) whose elements represent the requirement level of each of the parameters used in the decision process. The metrics associated with the ability of a particular server (104) to satisfy the request (102) is referred to as a capability vector (136). Each element of this vector (136) has a counterpart in the requirement vector (116). During operations, each request (102) has its own requirement vector (116), and each server or processing node (104) has its own capability vector (136). The vector space distance between the requirement vector (116) and capability vectors (136) for any given pairing of request (102) and server (104) represents the degree of mismatch (cost) incurred by the corresponding assignment of the request to that server. If the vectors are identical, the cost is zero.

The assignment of multiple simultaneous requests (102) can be done in several ways. As described above, the preferred approach creates a requirement vector (116) for each request (102) and capability vector (136) for each resource (104). The distance vector between each pair of request to resource then becomes an element in a cost matrix whereby the row index is a request identifier and the column index is the resource identifier. The cost matrix is usually sparse since some assignments may be ruled out for simple reasons. A decision-making algorithm then selects a resource for each request so that the sum of all the costs in the matrix is minimized for all combinations of requests and resources. There are several minimization techniques available, such as general neural network techniques, simulated annealing methods and generic assignment algorithm approaches The preferred algorithm provides a fast quasi-optimal solution to the distribution problem based on standard methods. One example of such a standard method is a neural network paradigm as described in U.S. Pat. No. 5,548,683, the disclosure of which is hereby incorporated by reference. Other examples of generic algorithm approach would be a greedy search solution algorithm. A greedy algorithm can be applied when the optimization problem is to decide whether or not to include some element from a given set. A greedy algorithm begins with no elements and sequentially selects an element from the feasible set of remaining elements by myopic optimization. (The elements could have been sorted by some criterion, such as associated weights.) This results in an optimal solution to the problem if, and only if, there is an underlying matroid structure (for example, a spanning tree). Other types of generic assignment algorithms would include auction algorithms or Munres algorithms.

Although the preferred embodiment has been described herein, numerous changes and variations can be made and the scope of the present invention is intended to be defined by the claims.

What is claimed is:

1. A method for allocating a server, selected from a plurality of servers, to client requests originating over a predefined time interval at a plurality of user accounts, the method comprising:

collecting a plurality of client requests that arrive within the predefined time interval wherein at least two of said client requests are serviceable by the server and wherein a first of said at least two of said client requests originates at a first user account and a second of said at least two of said client requests originates at a second user account;

determining a first value of a cost metric for a first set of client request-server pairings wherein said first set includes at least one client request-server pair with said server being paired with either said first or said second of said at least two client requests;

determining a second value of a cost metric for a second set of client request-server pairings wherein said second set includes at least one client request-server pair with said server being paired with both said first and said second of said at least two client requests; and at the end of said predefined time interval distributing said client requests according to one of said first and said second set of client request-server pairings based on said first and second values of said cost metric;

wherein the step of determining the first or the second value of a cost metric for the first or the second set of client request-server pairings further comprises the steps of:

initializing the first or second set of client request-server pairings at a commencement of the predefined time interval;

a) selecting a client request-server pair to satisfy a selection criteria;

b) creating a requirement vector corresponding to said client request;

c) creating a capability vector corresponding to said server;

d) calculating a distance between the requirement vector and the capability vector and adding said distance to a cumulative value when said distance exceeds a match threshold value and repeating steps a), b), c) and d); and e) adding said client request-server pair to said set of client request-server pairings when said distance exceeds the match threshold value, said cumulative value is less than a cost threshold and said client request has arrived within said predefined time interval.

2. The method of claim 1 wherein the step of determining the value of the first or the second cost metric for the first or the second set of client request-server pairings comprises the steps of:

at the commencement of said predefined time interval, initializing a cumulative value to zero;

for each client request-server pair in the first or the second set of client request-server pairings, a) creating a requirement vector corresponding to said client request;

b) creating a capability vector corresponding to said server;

c) calculating an inner product of said requirement vector and said capability vector and adding said inner product to the cumulative value and repeating steps a), b) and c) for all client request-server pairs in the first or second set of client request-server pairings whereupon said cumulative value represents the value of the cost metric.

3. The method of claim 1 wherein the step of distributing said client requests further comprises distributing said client requests according to said first set of client requests-server pairings if said first value of the cost metric is lower than the second value of the cost metric otherwise distributing said client requests according to said second set of client requests-server pairings.

4. The method of claim 1 wherein said selection criteria comprises matching a client request with a server to generate at least one client request-server pairing belonging to one of said first set and said second set.

5. A system for distributing load within a client-server computer network, comprising:

a plurality of interconnected computer servers, each server having at least one processor, wherein each computer server is associated with a capability vector having at least one element associated with a resource expected to be requested by at least one of a plurality of incoming client requests;

a dynamic capability vector determining module configured to generate a dynamic capability vector for each server of said plurality of interconnected servers, said dynamic capability vector representing an update to said capability vector such that the at least one element of the capability vector corresponds to an unused portion of the resource associated with the at least one element and measured at the commencement of one of a sequence of predefined time intervals;

a requirement vector determining module configured to generate a requirement vector for each incoming client request during the one of the sequence of predefined time intervals; and a load balancing module for selectively pairing said plurality of interconnected computer servers with one or more of said plurality of incoming client requests so as to minimize a cost metric computed during the one predefined time interval in said sequence of predefined time intervals wherein said cost metric is a function of vector distances between said dynamic capability vectors and said requirement vectors associated with said computer servers and said client request pairs in said computer server-client request pairing;

wherein said load balancing module further comprises a plurality of instances of load balancing modules resident on an appropriate plurality of servers disposed at intermediate nodes forming a connectivity hierarchy of layers throughout said computer client-server network such that said cost metric is computed and minimized for at least one layer of server nodes corresponding to the same connectivity hierarchy whereby each incoming client request is satisfied by a plurality of computer servers and transmission paths.

* * * * *